(12) United States Patent
Scheijgrond et al.

(10) Patent No.: US 9,013,052 B2
(45) Date of Patent: Apr. 21, 2015

(54) APPARATUS FOR HARVESTING ENERGY FROM A BODY OF WATER AND A METHOD

(75) Inventors: Peter Cornelis Scheijgrond, Gouda (NL); Margriet Geesink, Utrecht (NL); Guido Michael Massaro, Amsterdam (NL); Bas Vosbergen, Zaandijk (NL)

(73) Assignee: Ecofys Investments B.V., Rotterdam (NL)

(*) Notice: Subject to any disclaimer, the term of this patent is extended or adjusted under 35 U.S.C. 154(b) by 906 days.

(21) Appl. No.: 13/131,754

(22) PCT Filed: Nov. 28, 2009

(86) PCT No.: PCT/NL2009/000236
§ 371 (c)(1),
(2), (4) Date: Aug. 29, 2011

(87) PCT Pub. No.: WO2010/062170
PCT Pub. Date: Jun. 3, 2010

(65) Prior Publication Data
US 2011/0299985 A1    Dec. 8, 2011

(30) Foreign Application Priority Data

Nov. 28, 2008  (NL) .................................... 1036254
Jan. 16, 2009  (NL) .................................... 1036429

(51) Int. Cl.
*F03B 13/12*   (2006.01)
*F03B 17/06*   (2006.01)

(52) U.S. Cl.
CPC ............. *F03B 17/062* (2013.01); *F03B 17/063* (2013.01); *F05B 2210/404* (2013.01); *F05B 2240/212* (2013.01); *Y02E 10/28* (2013.01); *Y02E 10/38* (2013.01)

(58) Field of Classification Search
CPC .... F03B 13/183; F03B 17/062; F03B 17/063; F05B 2210/404; F05B 2240/212; F05B 2240/214; Y02E 10/28; Y02E 10/38
See application file for complete search history.

(56) References Cited

U.S. PATENT DOCUMENTS 4,264,279 A * 4/1981 Dereng ..................... 416/227 A
4,325,674 A * 4/1982 Ljungstrom .................... 416/19

(Continued)

FOREIGN PATENT DOCUMENTS

DE  20 2007 010 873 U1  11/2007
DE     202007010873 U1 * 11/2007

(Continued)

*Primary Examiner* — Tulsidas C Patel
*Assistant Examiner* — S. Mikailoff
(74) *Attorney, Agent, or Firm* — Shewchuk IP Services, LLC; Jeffrey D. Shewchuk

(57) ABSTRACT

The invention relates to a device for harnessing energy from a body of water, which device
  comprises a Darrieus rotor having at least two Darrieus rotor blades, and
  comprises at least two connecting arms which connect the Darrieus rotor blades with a central axis, wherein per Darrieus rotor blade a first, proximal section of a connecting arm is connected to the central axis and a point of the connecting arm situated at a distance of the proximal section is connected to a first point on the Darrieus rotor blade,
wherein
  at least the connection between the point of a connecting arm situated at a distance of the first proximal section and the first point on a Darrieus blade is a hingable connection,
  for every Darrieus rotor blade, of at least one connecting arm the connection between the proximal section of the connecting arm and the central axis is a rigid connection.

12 Claims, 3 Drawing Sheets

(56) References Cited

U.S. PATENT DOCUMENTS

Figure 1:
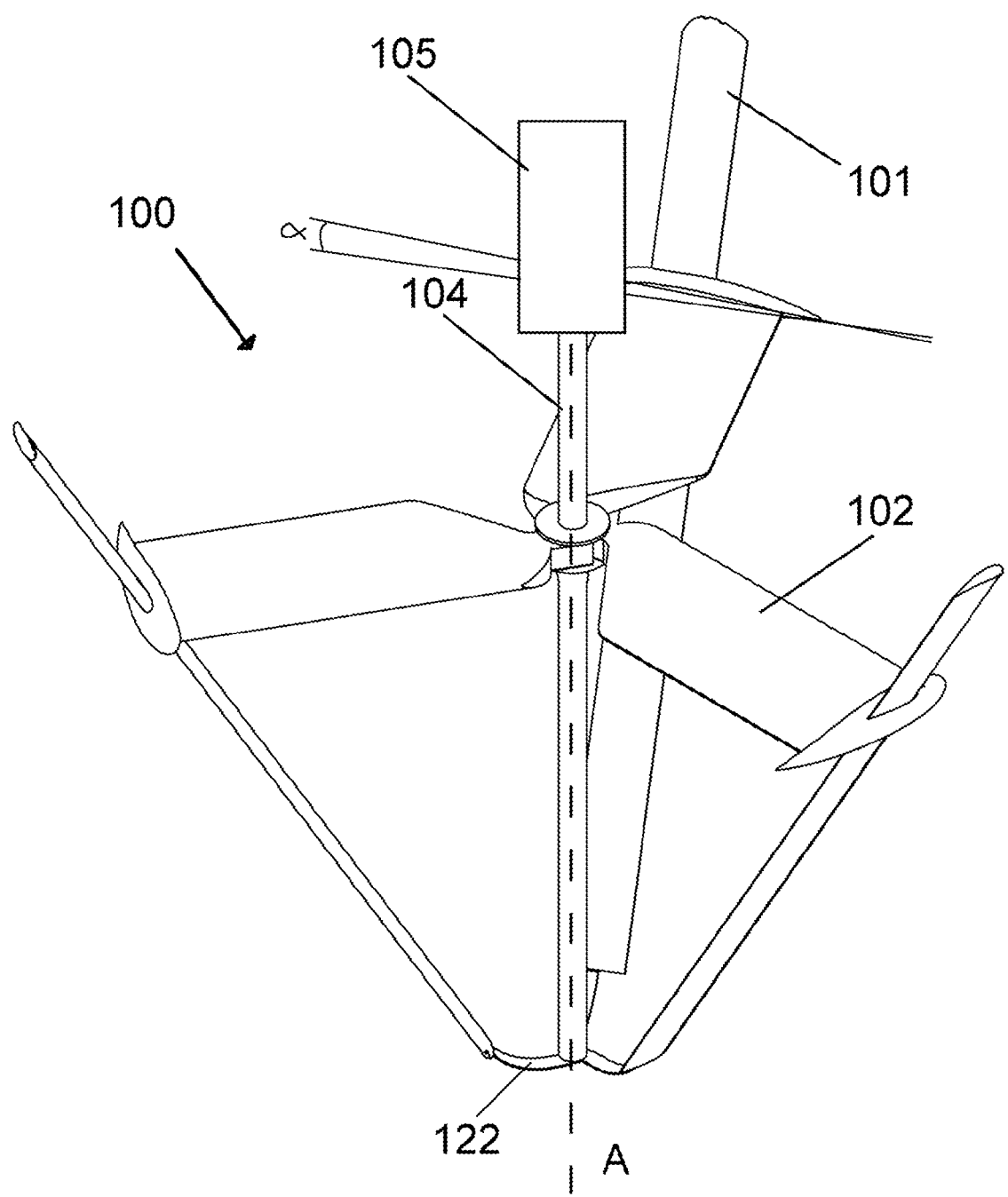

| | | | | |
|---|---|---|---|---|
| 4,334,823 | A | * | 6/1982 | Sharp ............... 416/119 |
| 4,415,312 | A | * | 11/1983 | Brenneman ............... 416/119 |
| 4,430,044 | A | * | 2/1984 | Liljegren ............... 416/119 |
| 5,183,386 | A | * | 2/1993 | Feldman et al. ............... 416/119 |
| 5,269,647 | A | * | 12/1993 | Moser ............... 415/2.1 |
| 6,320,273 | B1 | * | 11/2001 | Nemec ............... 290/55 |
| 2004/0170501 | A1 | * | 9/2004 | Seki ............... 416/223 R |
| 2011/0198849 | A1 | * | 8/2011 | Scheijgrond ............... 290/53 |

FOREIGN PATENT DOCUMENTS

| | | | |
|---|---|---|---|
| FR | 2865777 A1 | * | 8/2005 |
| WO | 8401406 A1 | | 4/1984 |
| WO | 0244558 A1 | | 6/2002 |
| WO | WO 0244558 A1 | * | 6/2002 |
| WO | WO 2010011133 A1 | * | 1/2010 |

* cited by examiner

APPARATUS FOR HARVESTING ENERGY FROM A BODY OF WATER AND A METHOD

The present invention relates to a device for harnessing energy from a body of water, which device
- comprises a Darrieus rotor having at least two Darrieus rotor blades, and
- comprises at least two connecting arms which connect the Darrieus rotor blades with a central axle, wherein per Darrieus rotor blade a first, proximal section of a connecting arm is connected to the central axle, and a point of the connecting arm situated at a distance of the proximal section is connected to a first point on the Darrieus rotor blade, and
- the Darrieus rotor and the connecting arms are rotatable about a common axis of rotation,
- each Darrieus rotor blade on a second point thereof, in longitudinal direction of the Darrieus rotor blade situated at a distance of the first point, is connected with the central axle of the device, either via a second connecting arm or otherwise.

Such a device is known from WO02/44558. It allows the effective harnessing of wave energy. The driving forces exerted by the water on the Darrieus rotor blades have to be passed on effectively to the central axle in order to let it rotate, which requires a rigid construction. The advantage of harnessing energy from a body of water such as a river, estuarium, or sea—i.e., a location in a body of water with a high energy density—at the same time constitutes a problem for such devices. Since a device for harnessing energy from a body of water has to be able to, besides the usual varying loads, withstand heavy weather conditions as well, very sturdy and thus relatively expensive constructions are necessary.

The object of the present invention is to provide a device with a rigid construction which has an increased load-bearing capacity.

To this end the present invention provides a device according to the preamble, wherein
- at least the connection between the point of a connecting arm situated at a distance of the first proximal section and the first point on a Darrieus blade is a hingable or hinged connection,
  - for every Darrieus rotor blade, of at least one connecting arm the connection between the proximal section of the connecting arm and the central axle is a rigid connection,
- wherein the axis of rotation of the hingable connection
  - is at an angle α of less than 30° with a plane perpendicular to the axis of rotation of the Darrieus rotor, and
  - is at an angle β of less than 15° with a plane perpendicular to a line that runs from the axis of rotation of the Darrieus rotor to the leading edge of the particular Darrieus rotor blade at the height of the hinge, which line is situated in a plane perpendicular to the axis of rotation of the Darrieus rotor.

Such a device has an improved capability of handling varying loads since on the one hand it is rigid to such an extent that the driving forces exerted on the Darrieus rotor blades are transferred to the central axle effectively, whereas on the other hand bending moments in the rotor blades are reduced, in particular near the transition of the Darrieus rotor blades to the connecting arms. The invention combines an easy assembly with a great robustness, also since bolts disposed through Darrieus rotor blades and/or connecting arms, which would weaken reinforcing elements in the Darrieus rotor blades and/or connecting arms, such as hollow profiles, can be avoided while in addition a hydrodynamic low resistance profile can be accomplished at the hingable connection. Preferably, every connection between the proximal section of every connecting arm and the central axle is a rigid connection, thus achieving a very strong construction which nevertheless is very well capable of receiving bending moments. The device can for instance be used for harnessing wave energy or tidal energy at relatively low cost.

In accordance with an advantageous embodiment the elements connected via the hingable or hinged connection each include a hinge part. Each hinge part includes one or more fingers which mutually contact one or more fingers on the opposing hinge part across an area of contact.

Although it is conceivable that the hingable connection is in the shape of a reduction in thickness, it is preferred for reasons of strength that the hingable connection is constituted by a hinge. The area of contact of the hinge part on the Darrieus blade can shift, in the longitudinal direction of the Darrieus blade, relative to the area of contact of the hinge part on the connecting arm, or else is rotatable relative thereto, in which latter case the one area of contact is concave and the other area of contact is convex.

In accordance with an advantageous embodiment the device comprises a second connecting arm, a first, proximal section of the second connecting arm is rigidly connected to the central axle, and a point of the second connecting arm situated at a distance from the first proximal section is connected to the second point on the Darrieus rotor blade via a hingable connection.

Thus, a larger flow-through surface can be achieved, and consequently more energy can be harnessed, whereby on the one hand the greater driving forces occurring herewith are effectively passed on, while on the other hand no bending moment is passed on.

According to a preferred embodiment at least the connecting arms which connect the first points of the Darrieus blades with the central axle are Wells rotor blades.

Such a device is especially suitable for harnessing wave energy. The number of Wells blades that connect the Darrieus blades with the central axle is preferably equal to the number of Darrieus blades or twice as much. In the latter case the second connecting arms are also Wells rotor blades.

Preferably, the second connecting arms are shorter than the Wells rotor blades that connect the first points of the Darrieus blades with the central axle.

In that case the lower distal end of a Darrieus blade is located closer to the axis of rotation of the device than the upper distal end. In that case the most preferred angle between a Darrieus rotor blade and the axis of rotation is 25-35°.

This embodiment is particularly suitable for harnessing wave energy.

In practice, a typical device according to the invention will have a generator selected from i) a generator to generate electricity, and ii) a generator to generate fluid-pressure.

As fluid, a liquid or gas can be used, preferably air.

The present invention also relates to a method for harnessing energy from a body of water, wherein a device according to the invention is introduced into a body of water in which waves and/or flow occur naturally.

For harnessing wave energy the average wave height (between valley and top) of a suitable body of water is at least 50 cm per year.

An advantageous embodiment is characterized in that at least the connecting arms connected with a first point of the Darrieus blades, which first point is situated higher than the second point, are Wells rotor blades and the Wells rotor blades are located at a depth between 0.5 and 2.0, preferably between 0.8 and 1.25 times the 5 minutes average wave height below the level of the body of water.

Thus, wave energy can be harnessed very effectively.

In accordance with an advantageous embodiment the upper tips of at least two Darrieus blades protrude above the water surface.

Thus, a high energy output can be achieved. For a body of water with waves the upper tips of at least two Darrieus rotor blades will protrude at least twice the year average wave height.

In accordance with an advantageous embodiment the axis of rotation averaged over 5 minutes is less than 5° to the vertical.

In that way the highest energy output is achieved.

In accordance with an advantageous embodiment of the method, energy selected from hydraulic energy, pneumatic energy, electricity or hydrogen gas is generated.

The hydrogen gas can be obtained by means of electrolysis using electricity generated by the device.

In the application the following definitions are used:

A rotor is an assembly of two or more rotor blades, the latter of which are also designated as blades for short.

A Wells rotor comprises at least two blades, wherein the blades are convex at both sides of a plane formed by the leading edge and the trailing edge of the blade. With respect to that plane a Wells blade is preferably mirror symmetrical. Wells blades extend in a substantially radial direction with respect to the axis of rotation of the Wells rotor. The plane of a blade can be at an angle of at most 15° to the normal of the axis of rotation of the Wells rotor, preferably at most 5°, and even more preferably 0°.

A Darrieus rotor comprises at least two blades and with a device according to the invention usually 3 or 4, wherein the blades in the plane of the axis of rotation and the normal of the axis of rotation in said plane are at an angle with the axis of rotation of at most 60°, and preferably at most 45°. An advantageous angle is for instance 0° (wherein a Darrieus blade does not intersect the axis of rotation).

The broadness (also designated as cord) of a blade is the shortest through-going distance between the front side and back side of the profile (in English the leading and trailing edge).

Figure 2:
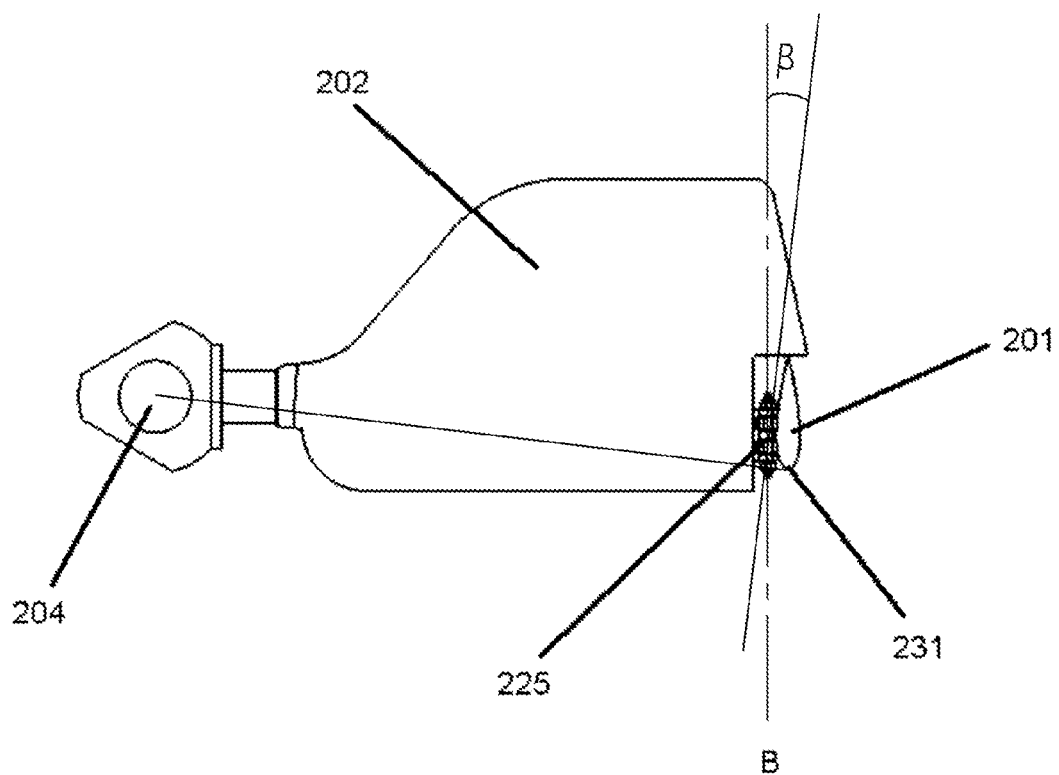
Figure 3:
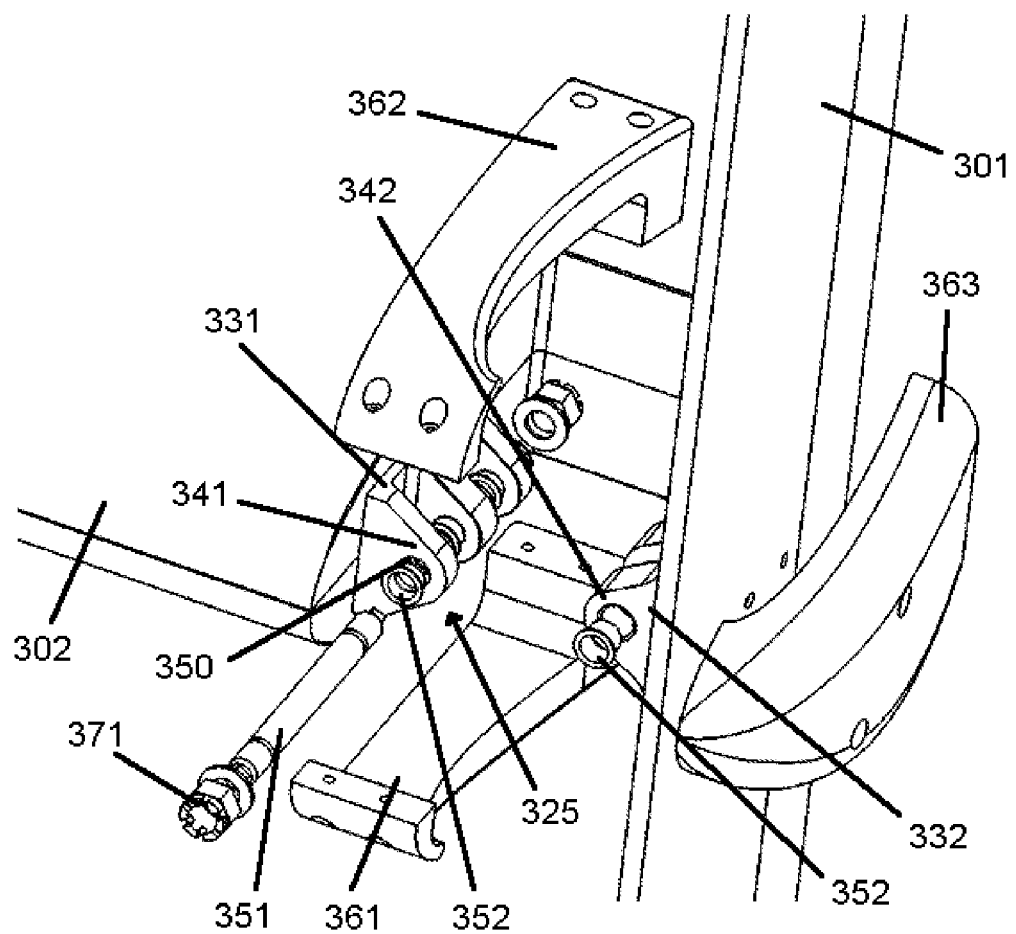

The present invention will now be illustrated with reference to the drawing, where FIG. 1 shows a perspective view of a device for the use of wave energy according to the invention;

FIG. 2 shows in cross section a detail in bottom view of a detail of the device of FIG. 1; and FIG. 3 shows an exploded sectional view of a detail of the device of FIG. 1.

FIG. 1 shows a device 100 according to the invention for the use of wave energy, which device 100 comprises three first rotor blades 101 of the Darrieus type and three first connecting arms in the form of second rotor blades 102 of the Wells type. The second rotor blades 102 which act as first connecting arms are at the proximal ends thereof rigidly connected to a central axle 104, which is connected with a generator 105 to generate electricity. The centreline of the central axle 104 coincides with the axis of rotation A of the totality of the Darrieus rotor blades 101 and the first connecting arms 102. The first connecting arms 102 are near the distal ends thereof hingably connected with first points on the Darrieus rotor blades. Hereinafter, this will be further elucidated. With the embodiment of the device according to the invention as illustrated here the Darrieus blades 101 are arranged obliquely and connected at second points via connecting arms 122 to the central axle 104. The connections between the second points and the second connecting arms 122 and the connections between the connecting arms 122 and the central axle 104 are rigid connections. Especially for second connecting arms that are somewhat longer it will be preferred if the connections between the second points and the second connecting arms 122 are carried out hingably as well.

The device 100 shown in FIG. 1 is for instance placed into the sea using a pillar (not represented), as disclosed in the earlier application WO02/44558.

FIG. 2 shows a cross section through a detail of the device 100 of FIG. 1 in bottom view. The central axle 204 can be seen which is rigidly connected to a proximal section of the first connecting arm 202, which has the shape of a Wells rotor blade. Near the distal end of the first connecting arm 202 a Darrieus rotor blade 201 is located, which is connected via a hinge 225 to the first connecting arm 202. The hinge 225 allows the bending of the Darrieus rotor blade 201 with respect to the first connecting arm 202 about an axis of rotation B. For the embodiment shown this is situated in a plane that is perpendicular to the axis of rotation A (angle α is 0°). In said plane the line B makes a pitch angle β of 3.5° to a plane perpendicular to a line that runs from the axis of rotation to the leading edge 231 of the Darrieus rotor blade 201.

FIG. 3 shows an exploded sectional view of the hinge of FIG. 2. The Darrieus rotor blade 301, the first connecting arm 302, and hinge 325 can be seen. The hinge 325 comprises a first hinge part 331 having three first fingers 341 which is rigidly connected with the first connecting arm 302, and a second hinge part 332 with two second fingers 342 which is rigidly attached to the Darrieus rotor blade 301. When assembled, the second fingers 342 are located between the first fingers 341. The first and second fingers are all provided with openings 350 through which a hinge pen 351 is placed, which is secured with castle nuts 371. Carrying bushes 352 reduce the friction between the moving parts (i.e. hinge pen 351, first fingers 341 and second fingers 342) and limit the clearance between these.

For lowering the resistance through the water, filler blocks 361, 362, 363 are provided.

The invention claimed is:

1. A device for harnessing energy from a body of water, the device comprising:
   a central axle;
   a Darrieus rotor having at least two Darrieus rotor blades, each Darrieus rotor blade being directly or indirectly connected with the central axle at a first longitudinal location on the Darrieus rotor blade; and
   at least two connecting arms connecting the Darrieus rotor blades to the central axle, each connecting arm being attached to its respective Darrieus rotor blade with a hinged connection, the hinged connection being at a second longitudinal location on the Darrieus rotor blade longitudinally spaced from the first longitudinal location, such that the Darrieus rotor and the connecting arms are rotatable about a common axis of rotation with the central axle, each connecting arm being attached to the central axle with a rigid connection which establishes an angle of the connecting arm relative to the common axis of rotation;
   wherein an axis of hinging of the hinged connection:
      is at an angle α of less than 30° with a plane perpendicular to the common axis of rotation, and
      is at an angle β of less than 15° with a plane perpendicular to a line that runs from the common axis of rotation to a leading edge of the particular Darrieus rotor blade near the hinged connection, which line is situated in a plane perpendicular to the common axis of rotation.

2. A device according to claim 1, wherein the hinged connection is provided by a hinge having a first hinge portion on the connecting arm and a second hinge portion on the Darrieus rotor blade, wherein the first hinge portion has one or more fingers making contact with one or more fingers of the second hinge portion.

3. A device according to claim 1, wherein the connecting arms are Wells rotor blades.

4. A device according to claim 3, wherein second connecting arms connecting each Darrieus rotor blade with the central axle are shorter than the Wells rotor blades.

5. A device according to claim 1, further comprising a generator driven by the Darrieus rotor blades, the generator selected from i) a generator to generate electricity, and ii) a generator to generate fluid-pressure.

6. A method to generate energy from a body of water, comprising:
 introducing a device into a body of water in which waves and/or flow occur naturally, the device comprising:
  a central axle;
  a Darrieus rotor having at least two Darrieus rotor blades, each Darrieus rotor blade being directly or indirectly connected with the central axle at a first longitudinal location on the Darrieus rotor blade; and
  at least two connecting arms connecting the Darrieus rotor blades to the central axle, each connecting arm being attached to its respective Darrieus rotor blade with a hinged connection, the hinged connection being at a second longitudinal location on the Darrieus rotor blade longitudinally spaced from the first longitudinal location, such that the Darrieus rotor and the connecting arms are rotatable about a common axis of rotation with the central axle, each connecting arm being attached to the central axle with a rigid connection which establishes an angle of the connecting arm relative to the common axis of rotation;
 wherein an axis of hinging of the hinged connection:
  is at an angle $\alpha$ of less than 30° with a plane perpendicular to the common axis of rotation, and
  is at an angle $\beta$ of less than 15° with a plane perpendicular to a line that runs from the common axis of rotation to a leading edge of the particular Darrieus rotor blade near the hinged connection, which line is situated in a plane perpendicular to the common axis of rotation.

7. A method according to claim 6, wherein the connecting arms are Wells rotor blades located at a depth between 0.5 and 2.0 times a 5 minutes average wave height below a level of the body of water.

8. A method according to claim 6, wherein upper tips of at least two Darrieus blades protrude above the water surface.

9. A method according to claim 6, wherein the common axis of rotation averaged over 5 minutes is less than 5° from vertical.

10. A method according to claim 6, wherein energy selected from hydraulic energy, pneumatic energy, electricity and hydrogen gas is generated.

11. The device of claim 1, wherein every connecting arm is rigidly connected to the central axle to establish the longitudinal position of the connecting arm on the central axle.

12. The method of claim 6, wherein every connecting arm is rigidly connected to the central axle to establish the longitudinal position of the connecting arm on the central axle.

* * * * *